Aug. 12, 1969    N. CADLE ETAL    3,460,736
COLLAPSIBLE BACK-UP RING FOR PIPE WELDING
Filed May 25, 1967    2 Sheets-Sheet 1
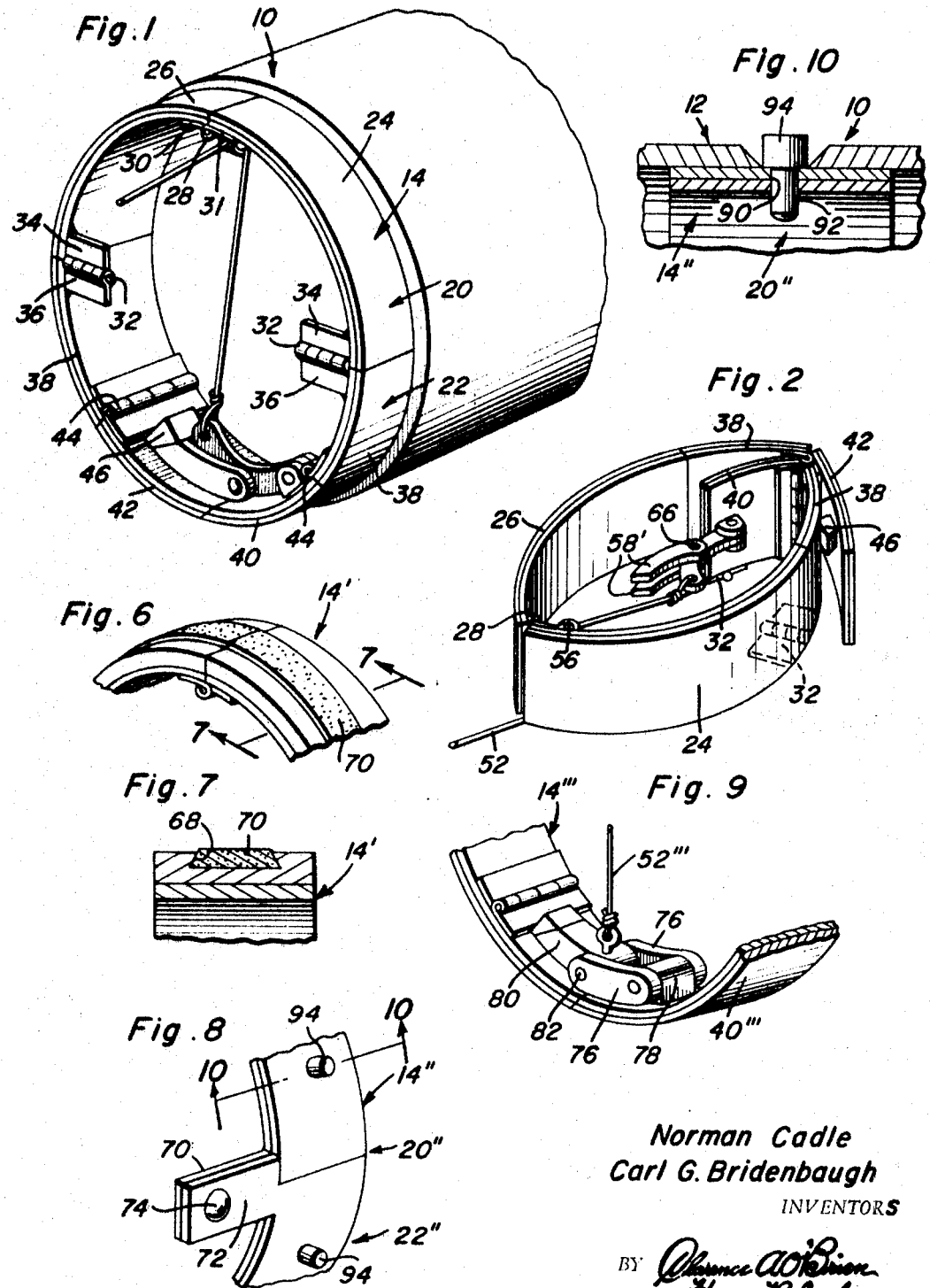
Norman Cadle
Carl G. Bridenbaugh
INVENTORS Aug. 12, 1969   N. CADLE ETAL   3,460,736
COLLAPSIBLE BACK-UP RING FOR PIPE WELDING
Filed May 25, 1967   2 Sheets-Sheet 2
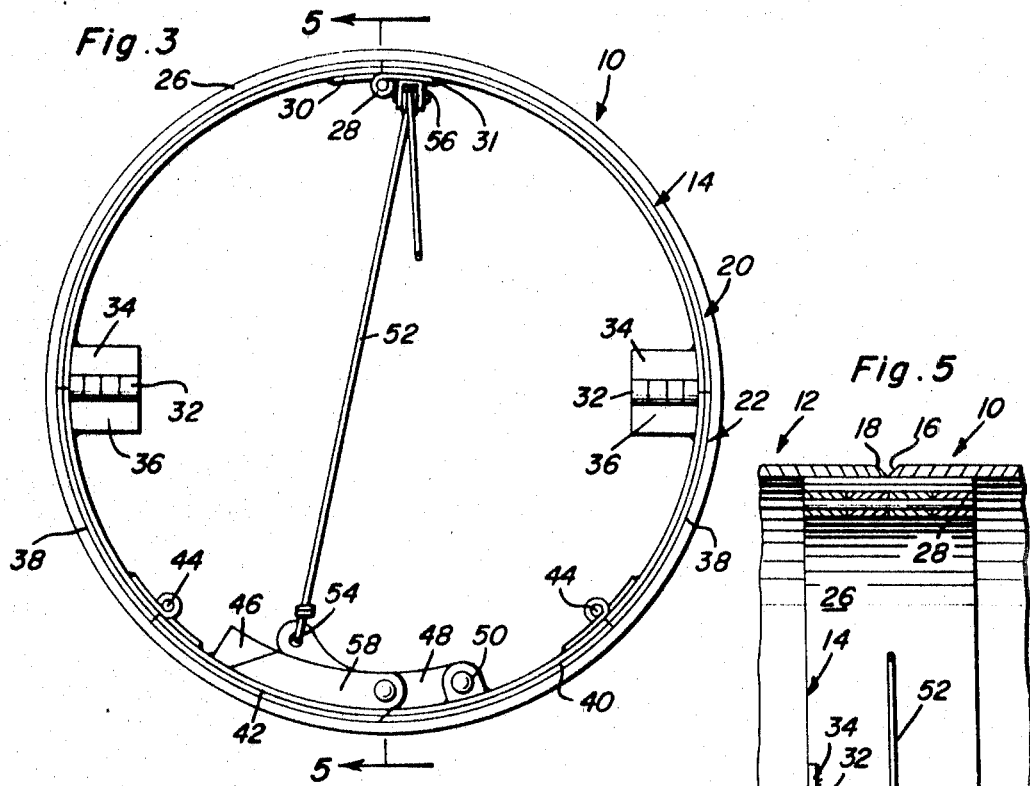
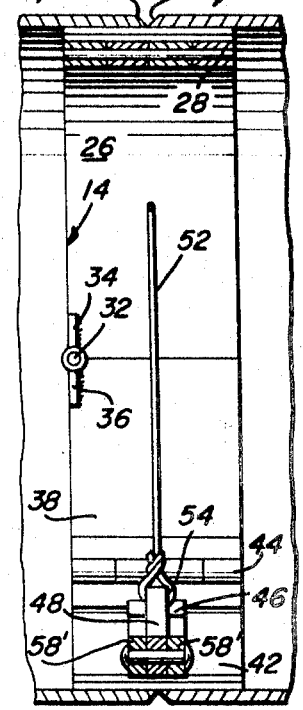
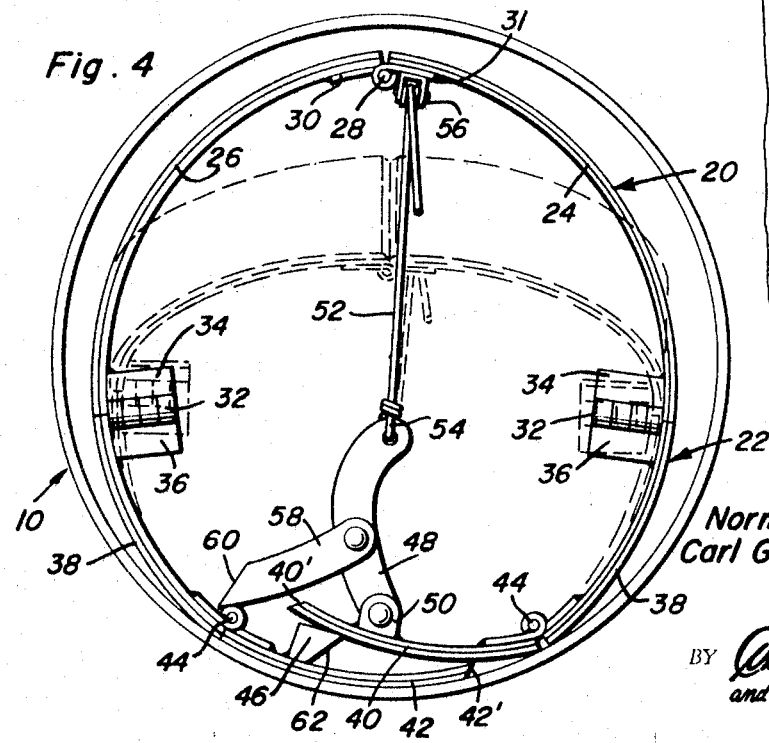
Norman Cadle
Carl G. Bridenbaugh
INVENTORS

United States Patent Office 3,460,736
Patented Aug. 12, 1969

3,460,736
COLLAPSIBLE BACK-UP RING FOR PIPE WELDING
Norman Cadle, R.D. 2, Box 40, Hollidaysburg, Pa. 16648, and Carl G. Bridenbaugh, R.D. 2, Barry Road, Greenville, Pa. 16125
Filed May 25, 1967, Ser. No. 641,247
Int. Cl. B23k 5/22, 9/02
U.S. Cl. 228—50                 11 Claims

ABSTRACT OF THE DISCLOSURE

A back-up member for the joint to be welded between end aligned and slightly axially spaced or fully abutted pipe sections and which may be first expanded into a generally cylindrical configuration forming a backing member for the joint as the pipe sections are positioned in end abutted relation and which may be collapsed from a remote location, such as one of the remote ends of the pipe sections, after the joint defined by the abutted ends of the pipe section has been welded, after being collapsed the back-up ring being sufficiently small in cross-sectional area to be readily axially withdrawn from one of the remote ends of the welded pipe sections.

---

The collapsible back-up ring of the instant invention has been specifically designed to provide means for backing a joint between abutted ends of a pair of pipe sections, for holding the pipe sections in perfect alignment while they are being welded together and for preventing softened portions of the pipe sections being welded from being displaced inwardly of the inner surfaces of the pipe sections.

The back-up ring of the instant invention includes a plurality of arcuate sections connected together in a manner to form a collapsible ring and which may be expanded into a cylindrical member tightly frictionally gripping the internal surfaces of abutted end portions of pipe to be welded together. The collapsible back-up ring is also constructed so as to provide a generally cylindrical surface for substantially surface-to-surface abutting engagement with the inner cylindrical surface portions of pipe sections immediately adjacent a welded joint to be formed between the abutted ends of the pipe sections whereby softened portions of the pipe sections, due to the heat of the welding process and immediately adjacent the joint being welded, will not be allowed to be displaced inwardly of the inner surfaces of the unsoftened portions of the pipe sections being welded together.

The main object of this invention is to provide a collapsible back-up ring for backing a joint being welded between end abutted pipe sections and for maintaining the pipe sections in properly aligned positions during the welding operation.

Yet another object of this invention is to provide a back-up ring which may be readily collapsed from one of the remote ends of a pair of associated end abutted pipe sections and readily withdrawn from the one remote end after the joint between the pipe sections has been welded.

A still further object of this invention is to provide a collapsible back-up ring in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a pipe end portion in which the collapsible back-up ring of the instant invention has been mounted;

FIGURE 2 is a perspective view of the back-up ring in a fully collapsed position for withdrawal from an associated pipe section;

FIGURE 3 is an end elevational view of the assemblage illustrated in FIGURE 1 on an enlarged scale and as seen from the left side of FIGURE 1;

FIGURE 4 is a view similar to FIGURE 3 but illustrating a partially collapsed position of the back-up ring, a further collapsed position of the back-up ring being illustrated in phantom lines;

FIGURE 5 is a vertical sectional view taken substantially upon the plane indicated by section line 5—5 of FIGURE 3 and with a second pipe section abutted against the first pipe section and the back-up ring bridging the joint to be welded and defined between the abutted ends of the pipe sections;

FIGURE 6 is a fragmentary perspective view of a modified form of back-up ring;

FIGURE 7 is an enlarged fragmentary sectional view taken substantially upon the plane indicated by the section line 7—7 of FIGURE 6;

FIGURE 8 is a fragmentary perspective view of a slightly modified form of back-up ring;

FIGURE 9 is a fragmentary perspective view of still another modified form of back-up ring; and FIGURE 10 is a sectional view taken upon the plane indicated by the section line 10—10 of FIGURE 8 illustrating the use of removable spacing pins to properly position the back-up ring between slightly axially spaced pipe sections.

Referring now more specifically to the drawings, the numeral 10 generally designates a first pipe section and the numeral 12 generally designates a second pipe section. The collapsible back-up ring of the instant invention is generally referred to by reference numeral 14 and is illustrated in FIGURE 5 of the drawings expanded into frictional engagement with the inner surface portions of the adjacent abutted ends of the pipe sections 10 and 12, the latter including beveled end edge portions 16 and 18, respectively.

The back-up ring 14 includes a pair of semi-cylindrical half-sections generally referred to by the reference numerals 20 and 22 and it will be noted that the half-section 20 includes a pair of generally quarter sections 24 and 26 pivotally connected together by means of a hinge structure 28 including a pair of pivotally interconnected hinge leaves 30 and 31 secured to adjacent ends of the quarter sections 24 and 26 in any convenient manner. Accordingly, it may be seen that the pivot axis defined between the quarter sections 24 and 26 generally parallels the longitudinal center line of the back-up ring 14.

The opposite ends of the half-section 20 are pivotally secured to the adjacent opposite ends of the half-section 22 by means of hinge structures 32. The hinge structures 32 include pivotally connected hinge leaves 34 and 36 secured to corresponding ends of the half-sections 20 and 22 respectively. However, it will be noted that the hinge axes defined by the hinge structures are disposed on a single diameter of the back-up ring 14.

The half-section 22 includes opposite end sections 38 which are substantially identical in configuration except for being right and left handed and which have leaves 36 secured to corresponding ends thereof. The sections 38 have their adjacent ends pivotally secured to sections 40 and 42 by means of hinge assemblies 44 similar to the hinge assembly or structure 28 and the adjacent end edges of the sections 40 and 42 include complementary beveled end edges 40′ and 42′, see FIGURE 4.

An abutment 46 is carried by the section 42 and an arcuate lever has one end pivotally secured between a pair of laterally spaced apertured mounting ears 50 carried by the section 40 intermediate its opposite ends. The free end of the lever 48 has one end of an elongated flexible tension member 52 secured thereto as at 54 and the tension member 52 passes upwardly and through a pulley assembly 56 carried by the hinge leaf 31 of the hinge structure 28. In addition, one end of a slightly arcuate lever 58 is pivotally secured to the lever 48 intermediate its opposite ends and the other end of the lever 58 includes a beveled end surface 60 complementary to a beveled surface 62 on the side of the abutment 46 facing away from the adjacent hinge assembly 44.

In operation, the back-up ring 14 is erected within the end of the pipe section 10 in a position illustrated in FIG-URE 1 of the drawings by first inserting the back-up ring 14 partially within the pipe section 10 in the partially folded or collapsed condition illustrated in solid lines of FIGURE 4 of the drawings. Then, the hinge assemblies 44 may be spread apart upwardly so as to engage the upper periphery of the back-up ring 14 with the upper inner surfaces of the pipe section 10. Then, the beveled surface 60 of the free end of the lever 58 is disposed in opposing relation with the beveled surface 62 on the abutment 46 and the free end of the lever 48 is swung downwardly in a counterclockwise direction as viewed in FIG-URE 4 of the drawings to the over-center position thereof illustrated in FIGURE 1 of the drawings so as to thereby spread hinge assemblies 44 apart and expand the back-up ring 14 into tight engagement with the inner surfaces of the associated end of the pipe section 10. Then, the end of the pipe section 12 may be telescoped over the end of the back-up ring 14 projecting outwardly of the pipe section 10 in the manner illustrated in FIGURE 5 of the drawings until the opposing beveled end edges 16 and 18 of the sections 10 and 12 are disposed in abutting relation. Of course, with the free end of the section 12 properly supported, the back-up ring 14 will be fully operative to maintain the adjacent ends of the sections 10 and 12 properly aligned so that the sections 10 and 12 may be welded together by any suitable welding method.

After the sections 10 and 12 have been welded together, the free end of the tension member 52 which has previously been inserted through the pipe section 12 may be pulled in order to initially raise the free end of the lever 48 and thus circumferentially collapse the back-up ring 14 to the position thereof illustrated in solid lines in FIGURE 4 of the drawings. Then, continued pull on the tension member 52 will cause the half-section 20 to "break" or pivot relative to the half-section 22 about the axes defined by the hinged structures 32 so that the fully collapsed back-up ring 14 will fall to the lower portion of the adjacent ends of the sections 10 and 12. Finally, still further pulling on the tension member 52 will cause the back-up ring 14 to be pulled from the end of the pipe section 12 remote from the pipe section 10 with the back-up ring 14 in a position similar to the collapsed position thereof illustrated in FIGURE 2 of the drawings.

Although the lever 58 has been set forth as a single lever, it is to be noted that it actually comprises a pair of lever members 58′ secured together by means of a pivot pin 66 extending therebetween and rotatably received through the lever 48 centrally intermediate its opposite ends. Further, it is to be noted that each of the various sections of the back-up ring 14 includes an inner ply of rigid durable material such as steel and an outer ply of relatively good heat conductive material such as copper suitably bonded or secured to the corresponding inner ply. The utilization of an outer ply of copper enables excessive welding heat to be readily dissipated and prevents molten metal of which the pipe sections 10 and 12 are constructed from adhering to the back-up ring 14.

With attention now invited more specifically to FIG-URES 6 and 7 of the drawings there may be seen a modified form of back-up ring generally referred to by the reference numeral 14′ and which is substantially identical to the back-up ring 14 except that the outer arcuate ply sections thereof are slightly thicker and have longitudinally extending and open-ended dovetailed grooves 68 formed therein in which arcuate strips 70 of asbestos are removably secured.

With attention now invited to FIGURE 8 of the drawings there may be seen a second modified form of back-up ring generally referred to by reference numeral 14″ and which is substantially identical in construction to the back-up ring 14 except that the adjacent ends of the half-sections 20″ and 22″ thereof have their adjacent ends secured together by means of axially projecting and overlapped ear portions 70 and 72 pivotally interconnected by means of a pivot fastener 74, the pivot fasteners 74 being disposed in a plan generally paralleling but spaced axially from the adjacent end edge of the back-up ring 14.

From FIGURE 9 of the drawings there may be seen still another modified form of back-up ring generally referred to by reference numeral 14‴ and which is substantially identical to the back-up ring 14 except that the lever corresponding to the lever 48 comprises a pair of laterally spaced links 76 pivotally secured at corresponding ends to a mounting lug 78 carried by the section 40‴ and the lever 80 corresponding to the lever 58 comprises a single lever member having one end pivotally secured between the free ends of the links 76 by means of a pivot fastener 82. Further, the tension member 52‴ corresponding to the tension member 52 is anchored to the end link 80 pivotally secured between the free ends of the links 76.

The back-up rings of the instant invention provide a means for supporting the adjacent ends of the sections 10 and 12 together while a weld joint or connection is being formed between the sections 10 and 12. Further, when welding stainless steel pipe it is virtually impossible to weld without forming a protrusion or a very rough finish on the inside of the pipe sections being joined together when using an electric arc or a tungsten inert gas method. Of course, when using the tungsten inert gas method the interior of the pipe sections being welded together, at least immediately adjacent the weld being formed, is purged with an inert gas. However, when utilizing the back-up ring of the instant invention, no purging of the pipe sections immediately adjacent the joint to be welded is necessary inasmuch as the pressure from the tungsten inert gas torch is sufficient to envelop the inner surfaces of the pipe sections being welded together with an inert gas due to the surface-to-surface contacting engagement of the back-up ring with the inner surfaces of the pipe sections being welded together. In addition, as previously hereinbefore set forth, sag or protrusion causing a rough finish on the inside of the welded joint is completely eliminated when the back-up ring of the instant invention is utilized.

While a pair of aligned pipe section ends may be disposed in full end abutting relation prior to the welding step, if it is desired to maintain the aligned ends of the pipe sections in slightly axially spaced relation, the back-up ring being utilized may have its various arcuate elements provided with generally radial bores 90 in which the diametrically reduced end portions 92 of a plurality of headed pins 94 may be removably received in the manner illustrated in FIGURES 8 and 10 of the drawings. As can best be seen from FIGURE 10 the pins 94 may be utilized not only to maintain the pipe sections 10 and 12 in axially spaced relation but to also precisely position the back-up ring 14″ between the aligned adjacent ends of the pipe sections 10 and 12. Therefore, the utilization of the pins 94 serves three functions. First, the pins 94 may be utilized to maintain the pipe sections 10 and 12 in axially spaced relation. Secondly, the pins 94 provide a means whereby the back-up ring 14' may be maintained properly positioned relative to the adjacent ends of the pipe sections 10 and 12. Thirdly the pins 94 also serve to provide a means whereby, after the back-up ring 14' has been inserted into the pipe section 10 and at least partially expanded, the pipe section 12 need only be axially aligned with and telescoped over the extended axial end of the back-up ring 14' and pushed toward the pipe section 10 in order to properly position all three of the components 10, 12 and 14" relative to each other. Of course, the positioning pins 94 may be utilized on all of the back-up rings 14, 14', 14" and 14'".

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A collapsible back-up ring for adjacent ends of pipe sections to be butt welded together, said back-up ring comprising an assemblage expandable into and collapsible, from a remote location, from a condition defining a substantially rigid generally cylindrical member, said ring including at least three end aligned partial cylindrical sections together forming said cylindrical member, the pairs of adjacent ends of said sections being disposed in juxtaposed end aligned relation when said assemblage is expanded to form said cylindrical member, two pairs of adjacent ends of three of said sections being pivotally secured together for relative angular displacement of the corresponding sections about axes generally paralleling the center axis of said cylindrical member for generally radially inward swinging movement of one of said three sections relative to the adjacent section end, said end of said one section being at least slightly circumferentially shiftable relative to said adjacent section and between positions with the last mentioned ends disposed in and overlapped relation and slightly spaced apart in aligned relation, and means structurally associated with said one end of said one section and said adjacent section end operative to forcibly circumferentially expand said one end of said one section relative to said adjacent end, radially outwardly displace said one end of said one section into end aligned relation with said adjacent section end and releasably secure the last mentioned ends in end aligned juxtaposed relation with said assemblage expanded into tight frictional engagement with the opposing inner cylindrical surface portions of a tubular member into which said assemblage is at least partially telescoped.

2. The combination of claim 1 wherein said back-up ring includes a mechanism operative to releasably retain said ring in said expanded condition, said means including a release portion mounted for generally radially inward movement relative to said ring for releasing said means so as to allow said ring to collapse from said expanded condition, guide means carried by said ring generally radially inwardly of said release portion, and an elongated flexible tension member having one end secured to said release portion and its other end portion guidingly engaged by and shiftable longitudinally of said guide means.

3. The combination of claim 1 wherein said sections each include an inner ply constructed of a rigid hard material and an outer ply constructed of a softer material to which molten portions of at least partially ferrous pipe sections being welded together will not readily adhere.

4. The combination of claim 3 wherein the outer plies of said arcuate sections are constructed of a copper alloy.

5. The combination of claim 4 wherein said outer plies have longitudinally extending outwardly facing grooves formed therein and said grooves have at least slightly compressible fireproof fibrous segments disposed therein.

6. A collapsible back-up ring for adjacent ends of pipe sections to be butt welded together, said back-up ring comprising an assemblage expandable into and collapsible, from a remote location, from a condition defining a substantially rigid generally cylindrical member and adapted to be positioned, in expanded condition, within the end abutted adjacent ends of a pair of pipe sections to be welded together with the outer generally cylindrical surface portions of said cylindrical member disposed in substantially surface-to-surface contacting relation with the inner surface portions of said pipe sections adjacent the adjacent end edges of said pipe sections, said ring including a pair of generally semi-circular half-sections pivotally joined together at adjacent ends for rotation about aligned generally radially extending axes.

7. The combination of claim 6 wherein said axes are spaced laterally outwardly of one side of said ring.

8. A collapsible back-up ring for adjacent ends of pipe sections to be butt welded together, said back-up ring comprising an assemblage expandable into and collapsible, from a remote location, from a condition defining a substantially right generally cylindrical member and adapted to be positioned in expanded condition, within the end abutted adjacent ends of a pair of pipe sections to be welded together with the outer generally cylindrical surface portions of said cylindrical member disposed in substantially surface-to-surface contacting relation with the inner surface portions of said pipe sections adjacent the adjacent end edges of said pipe sections, said ring including a pair of generally semi-circular half-sections pivotally joined together at adjacent ends for rotation about aligned generally radially extending axes, each of said half sections including opposite end portions, when said ring is being collapsed, movable toward each other.

9. The combination of claim 8 wherein said half sections each include a pair of adjacent generally arcuate segments including adjacent end portions pivotally secured together for rotation about an axis generally paralleling the center axis of said ring.

10. The combination of claim 9 wherein one of said half sections includes two pairs of adjacent generally arcuate segments including adjacent end portions pivotally secured together, the remote ends of the remote segments of said pairs of segments being pivotally secured to the adjacent ends of the other of said half sections and the adjacent ends of the adjacent segments of said pairs of segments being abuttingly engaged with each other when said ring is in its expanded condition.

11. A collapsible back-up ring for adjacent ends of pipe sections to be butt welded together, said back-up ring comprising an assemblage expandable into and collapsible, from a remote location, from a condition defining a substantially right generally cylindrical member and adapted to be positioned in expanded condition, within the end abutted adjacent ends of a pair of pipe sections to be welded together with the outer generally cylindrical surface portions of said cylindrical member disposed in substantially surface-to-surface contacting relation with the inner surface portions of said pipe sections adjacent the adjacent end edges of said pipe sections, said ring being constructed of a plurality of adjacent interconnected arcuate segments, at least two of said segments including a generally radial bore, and an abutment pin removably received in each of said bores and including an outer end portion projecting outwardly of the outer surface of the corresponding segment, said pins being disposed generally in the same plane normal to the center line of said ring and spaced centrally intermediate the opposite ends of said ring.

References Cited

UNITED STATES PATENTS

| | | | |
|---|---|---|---|
| 2,987,022 | 6/1961 | Thielsch | 228—50 |
| 3,261,529 | 7/1966 | Pagan | 228—50 |
| 2,878,770 | 4/1959 | Work | 228—50 |

RICHARD H. EANES, Jr., Primary Examiner